United States Patent [19]
Foote

[11] 3,868,785
[45] Mar. 4, 1975

[54] FLYLINE FOR FISHING

[75] Inventor: Danny R. Foote, Spirit Lake, Iowa

[73] Assignee: Berkley & Company, Inc., Spirit Lake, Iowa

[22] Filed: Dec. 7, 1973

[21] Appl. No.: 422,715

[52] U.S. Cl. .......................................... 43/44.98
[51] Int. Cl. .......................................... A01k 91/00
[58] Field of Search ........ 43/44.98; 117/161, 161 P; 161/175

[56] References Cited
UNITED STATES PATENTS

| | | | |
|---|---|---|---|
| 2,862,282 | 12/1958 | Beebe | 43/44.98 |
| 3,043,045 | 7/1962 | Martuch | 43/44.98 |
| 3,334,436 | 8/1967 | Cole, Jr. | 43/44.98 |
| 3,486,266 | 12/1969 | Richardson et al. | 43/44.98 |
| 3,512,294 | 5/1970 | Howald | 43/44.98 |
| 3,523,034 | 8/1970 | Howald | 43/44.98 |

Primary Examiner—Warner H. Camp

[57] ABSTRACT

A flyline for fishing which comprises a core with a plurality of individual coatings, each containing microballoons and in certain instances, other fillers being applied thereover. The core comprises a generally continuous filament extending axially along the length of the line. A first coating is arranged over the core, with the first coating comprising a plastic matrix retaining a certain quantity of microballoons therein. The second coating is arranged over the first coating and comprises a plastic matrix retaining a different quantity of microballoons, with the microballoons in the second coating being smaller in diameter, and being included in a lesser percentage than in the first coating so as to provide a composite line with significant buoyancy determined primarily by the inner coating and with a finish determined by a harder and more dense outer shell. While the first or inner coating is normally of constant wall thickness, the second or outer coating may be tapered so as to provide a tapered diameter line.

14 Claims, 3 Drawing Figures

FLYLINE FOR FISHING

BACKGROUND OF THE INVENTION

The present invention relates generally to an improved flyline for fishing, and more particularly to a flyline for fishing which comprises a core having two or more distinct coatings disposed coaxially over the core, with each of these coatings normally containing a quantity of microballoons therein, with the inner coating or coatings having a lower specific gravity than the outer coating, and with the outer coating having a higher specific gravity along with increased hardness and durability.

In the past, flylines for fishing have been proposed which contain means for controlling the density, such as, for example, frothed coatings or coatings containing uniform quantities of microballoons therein. Generally speaking, however, these lines have been designed for purposes of density or specific gravity only, and normally have not responded to the mechanical requirements of the fisherman. The flyline of the present invention includes a central core which has individual layers or coatings applied thereover, with these coatings containing microballoons of predetermined size and in predetermined quantities so as to present a composite structure which possesses a desirable density as determined by the inner coating, along with a desired durability as determined by the second or outer coating.

SUMMARY OF THE INVENTION

Briefly, in accordance with the present invention, a flyline for fishing is provided which comprises a core having a plurality of individual coatings applied over the core. The core is preferably a continuous filamentary core and is disposed axially along the length of the composite line. Initially, the surface of the core is primed, and thereafter a first coating is arrangned coaxially over the core, with this coating comprising a plastic matrix which retains a plurality of microballoons distributed therethrough, with these microballoons having a certain first diameter. A second or outer coating is applied over the first coating, with the second coating comprising a plastic matrix retaining a plurality of microballoons which are substantially smaller in diameter than those in the first coating, and being contained in a quantity generally less than that of the first coating. Thus, the composite line is provided with an overall density determined primarily by the first or inner coating, and an outer coating or skin which provides the mechanical durability for the structure.

An added feature of the line is increased flexibility. This increased flexibility is obtained by virtue of the placing of the greater quantity of microballoons and those of greater diameter along a point reasonably close to the neutral flexural axis of the line. The outer coating, while possessing greater durability, and forming a skin for the line, retains its flexibility by virtue of its containing a smaller proportion of microballoons of smaller diameter than those of the first or inner coating.

By "microballoons", reference is made to those hollow particles which are, essentially, separate, unitary, and discrete structures, having a thin strong skin, and which are substantially spherical in shape. These hollow particles are prepared from film-forming material and they are normally substantially free of surface holes. Microballoons are commercially available in a variety of diameters, such as diameters ranging from between about 10 and 250 microns. The preparation of microballoons is disclosed in detail in U.S. Pat. No. 2,797,201, Veatch et al., dated June 25, 1957, and reference is made to that patent for its description of suitable techniques for preparing these articles.

Therefore, it is a primary object of the present invention to provide an improved flyline for fishing which consists of a central core having a plurality of coatings thereover, and with the coatings being tailored to provide a desired composite density or specific gravity, along with a desired durable outer coating or skin thereover.

It is a further object of the present invention to provide an improved flyline for fishing which comprises a core disposed generally axially along the length of the line, and with a first or inner coating arranged thereover which contains a certain quantity of relatively large microballoons distributed therethrough, and with an outer or skin coating arranged over the first coating which contains a somewhat lower proportion of generally smaller microballoons therein.

It is yet a further object of the present invention to provide an improved flyline for fishing which provides, in the composite, a line of controlled density and high durability, and wherein the density may be controlled by an inner level coat, and wherein the durability or surface characteristics may be determined by an outer or second coat which may be tapered in order to achieve an overall tapered affect in the flyline.

Other and further objects of the present invention will become apparent to those skilled in the art upon a study of the following specification, appended claims, and accompanying drawing.

DESCRIPTION OF THE PREFERRED EMBODIMENTS

Figures 1, 2, 3:
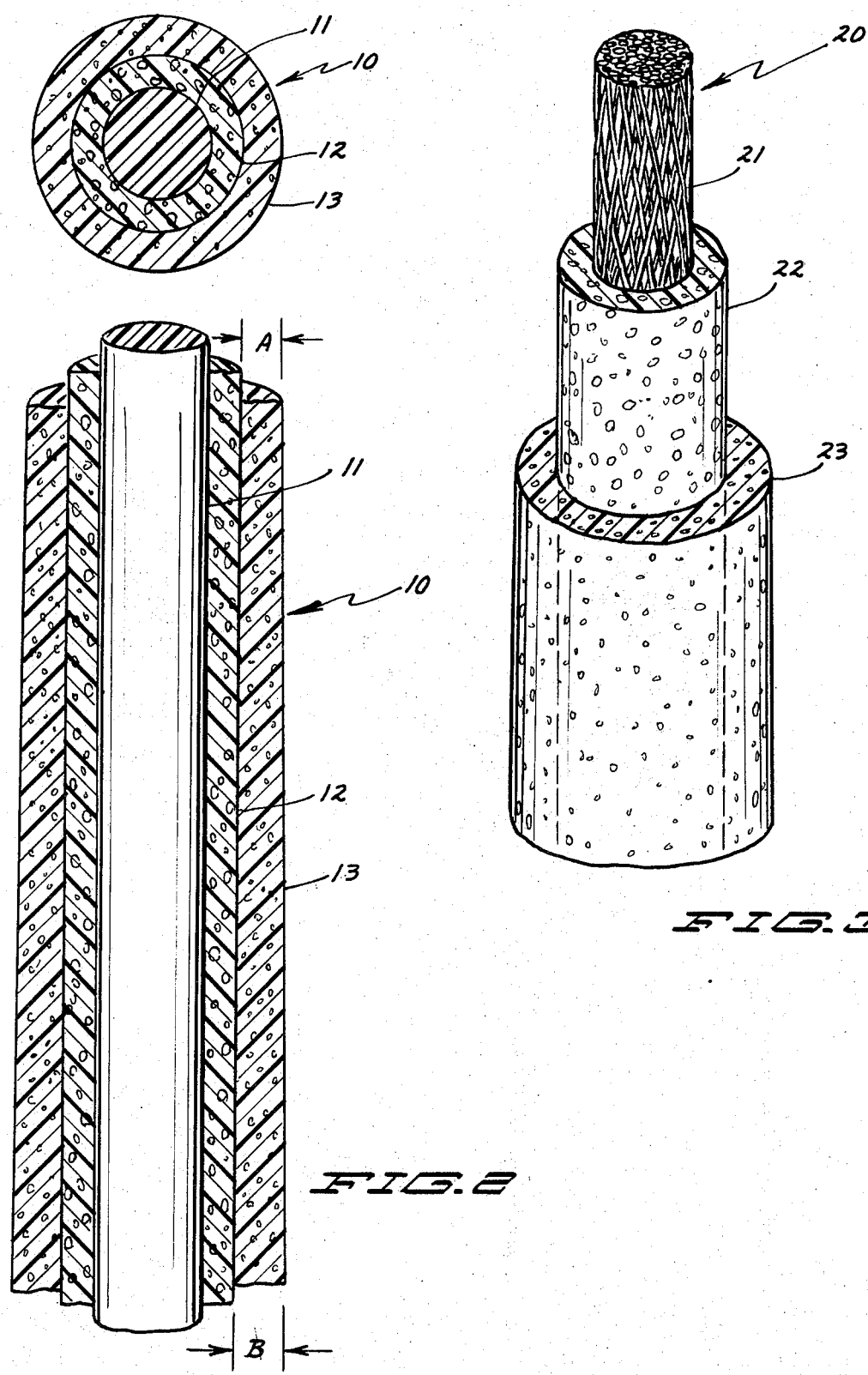
FIG. 1 is a sectional view taken through the diameter of a flyline prepared in accordance with the present invention, and illustrating the core with the superimposed coatings disposed therearound.
FIG. 2 is an elevational view of a segment of the flyline as illustrated in FIG. 1, and showing the first and second coatings partially in section as they are arranged about the core.
FIG. 3 is a perspective view of a somewhat modified form of flyline utilizing a filamentary core, and wherein the coatings are shown as being cut away at spaced axial dispositions.

In accordance with the preferred embodiments of the present invention, a flyline is provided which comprises a central core having a plurality of discrete coatings applied thereover. As is indicated in the modification shown in FIGS. 1 and 2, the core is essentially in the form of a monofilament line, while the embodiment illustrated in FIG. 3 comprises a line prepared from a plurality of multifilamentary bundles. Depending upon the end application desired, either the monofilament or multifilament core may be employed.

Turning now to the modification illustrated in FIGS. 1 and 2, the composite line structure generally designated 10 includes a central core 11 having a pair of coatings arranged thereover, these coatings including an inner or first coating 12 along with an outer or second coating 13. While a variety of combinations may be employed, typically or normally, the diameter of the core will range from about 40 percent up to about 65 percent of the diameter of the composite line, with wider ranges being possible.

The inner or first coating 12 is preferably a plastisol which forms a plastic matrix retaining a plurality of microspheres or microballoons of a first predetermined diameter. As indicated above, this first coating is provided with a larger proportion of microballoons than the second or outer coating, and at the same time, the microballoons in the inner coating are larger in diameter than those in the outer coating. Typically, the percentage by weight of microballoons in the inner coating will range from between about 8 and 12 percent, with a preferred range being from between about 9 and 11 percent. Also, the microballoons in the inner coating are preferably of a size of up to about 105 microns, and will generally be in the range of from between about 10 microns and 105 microns.

The outer coating which may be tapered, is normally prepared from the same plastisol as is employed in the inner coating, with the proportion of microballons present being reduced from that in the inner coating, and with the size of these also being reduced. In this connection, therefore, the outer coat may preferably contain from between about 7 percent up to about 11 percent of microballoons, with a range of from between about 8 and 10 percent being preferred. Also, these microballoons are somewhat smaller in diameter, and typically are from between about 10 microns and 75 microns in size.

In order to obtain a proper size selection for the microballoons, selective screening may be employed which typically involves a series of operations including a floating and a sifting of the microballoons through a sieve having the desired openings therein. For the inner coat, a quantity of microballoons ranging in size from between about 10 microns up to about 150 microns are sifted through a sieve having 105 micron openings. The floating operation disposes of fractured balloons, and the sifting being employed to achieve classification of the balloon sizes. For the second or outer coating, the same procedure is followed, with the exception of use of a 75 micron sieve.

In order to prepare a flyline in accordance with the present invention, the following procedure may be followed:

CORE MATERIAL

As indicated, the core may be prepared with either a monofilament, or may be in the form of a braid. A hollow nylon braid may be utilized consisting of multifilament bundles. Also, combinations of mono-multifilaments may be utilized with a multifilament sleeve being braided over an inner monofilament component to provide a composite core for the flyline, and in certain instances, it may be desirable to add a monofilament line portion directly to the core within one of the coatings. In the preparation of hollow nylon braid, the following cores are useful:

| Flylines | Strength | Construction | Tightness |
| --- | --- | --- | --- |
| Sizes 3–6 | 18 lbs. | 16 × 100 denier | moderate |
| Sizes 7–9 | 27 lbs. | 16 × 140 denier | moderate |
| Sizes 10 – | 36 lbs. | 16 × 210 denier | moderate |

The core material is preferably nylon, nylon being, of course, well known and widely available commercially. When monofilament nylon is utilized, one suitable monofilament which has been found adapted for this composite line is disclosed in U.S. Pat. No. 3,182,100, Berkley W. Bedell, dated May 4, 1965 and entitled "Monofilament Polyamide Fishline Composition".

CORE PREPARATION

In order to be confident of the elimination of knots, bad splices, or fuzzing, the braided multifilament bundles must be initially passed through an electronic sizing machine. The inspected line may then be dyed in a water soluble system at 200° ± 10° F., with the inspected line being passed through a water bath to remove any adherent anti-static or sizing agent which may be on the line surface. Thereafter, if desired, the line may be passed through a high heat source such as a fire ring or a flameless torch in order to burn, singe, or otherwise remove any small diameter hair-like filaments which may not have been detected by the electronic sizing machine.

CORE PRIMING

Clean, uniform, braided nylon core material is passed through a bath of acrylonitrile-butadiene adhesive. One specific primer material which has been found useful is an acrylonitrile-butadiene adhesive wherein the acrylonitrile-butadiene ratio is 35:65. These materials are, of course, commercially available. Tackifying agents may be employed, if desired. The primer, which is dispersed in a solvent of methylethyl ketone is permitted to air dry, and before being coated with a plastisol, is heated in order to insure complete solvent removal.

FIRST COAT MATERIAL

The inner plastic coating is based upon a vinyl plastisol. A plastisol is defined as a chemical composition which comprises essentially a dispersion of finely-divided, in the order of about 1 micron, polyvinylchloride particles having a sufficient porosity so that the material will disperse in a plasticizer mixture at the curing temperature which is in the order of about 175° C. Polyvinylchloride plastisols are, of course, commercially available.

A suitable plasticizer system may contain one or more of the conventional types of commercially available plasticizers such as, for example, trioctyl phosphate, dioctyl adipate, dioctyl-phthalate, or dioctyl-sebacate.

Certain commercially available plastisols may contain viscosity stabilizers such as, for example, vinyl acetate copolymers or the like. Again, these compositions are commercially available.

In the preparation of products pursuant to the present invention, the following formulation is provided:

| Component | Parts by Weight |
| --- | --- |
| Polyvinylchloride plastisol, with 40% of a plasticizer consisting of dioctyl sebacate; the vinyl portion comprising 15% polyvinyl acetate, balance polyvinylchloride | 398 |
| Floated-sifted microballoons, size 105 micron and smaller (105 sieve) | 50 |

-Continued

| Component | Parts by Weight |
| --- | --- |
| Wetting agent, consisting of water soluble nonylphenyl polyethylene glycol ether and available commercially from Union Carbide Corp. of New York, New York under the Code Name "Tergitol" | 35 |
| Wetting agent consisting of water insoluble octyl-phenol ethylene oxide and available from Joyce Wire Coatings Company of Providence, Rhode Island | 15 |
| Yellow pigment paste, available from Ferro Corporation of Cleveland, Ohio under the Code Number V-31940 | 1.5 |
| Fluorescent brightening agent available from Ciba-Geigy Corp. of Ardsley, New York under the Code Name "Tinopal SFG" | .5 |

SECOND COAT MATERIAL

The outer plastic coating is in the form of a plastisol having the following formulation:

| Component | Parts by Weight |
| --- | --- |
| Polyvinylchloride plastisol, with 40% of a plasticizer consisting of dioctyl sebacate; the vinyl portion comprising 15% polyvinyl acetate, balance polyvinylchloride | 312.5 |
| Floated-sifted microballoons through a 75 micron sieve | 24 |
| Wetting agent, water soluble nonylphenyl polyethylene glycol ether, available commercially from Union Carbide Corp. of New York, New York under the Code Name "Tergitol" | 8 |
| Wetting agent, water insoluble octyl-phenol ethylene oxide available from Joyco Wire Coatings Company of Providence, Rhode Island | 4 |
| Yellow pigment paste, available from Ferro Corporation of Cleveland, Ohio under the Code Number V-31940 | 1.0 |
| Fluorescent brightening agent available from Ciba-Geigy Corp. of Ardsley, New York under the Code Name "Tinopal SFG" | 0.5 |

COATING OPERATION

The coating is accomplished by applying the initial level and untapered coating through an iris diaphragm. The coating is preferably provided with a wall thickness ranging from between about 4 and 7 mils. The presence of the large microballoons insures proper line floatation. Cure is accomplished by passing the coated core vertically through a heating tower held at a temperature from between 335°–355° F. with a residence time of about 1 to 2 minutes being necessary to remove any volatiles and insure proper hardness and adhesion.

The second coating is applied, preferably as a tapered coating, having a maximum thickness generally equal to the maximum wall thickness of the first coating, with certain portions such as the tip being thinner than the thickness of the first coating, and with the belly portion being somewhat greater than the thickness of the first coating, and with a minimum wall thickness of approximately 2 to 3 mils.

For comparative data purposes, the following table is provided for a comparison of the application of the two coatings:

Table I

| Component | First Coat | Second Coat |
| --- | --- | --- |
| Polyvinylchloride plastisol | 78–86% | 84–90% |
| Microballoons | 8–12% | 7–11% |
| Microballoons (maximum size, microns) | 105 | 75 |
| Plasticizing Wetting Agents | 6–10% | 3–5% |

With reference to Table I, and the data presented therein, it will be appreciated that the proportion of plasticizer present in the outer coating is less than that present in the inner coating, with this difference ranging from between about 2 and 6 percent for most combinations. Also, the quantity of microballoons or proportions are somewhat less in the outer coating than in the inner coating, with this difference ranging, for example, by from about 0.5 percent up to about 1.5 percent. With regard to the plasticizing wetting agents, and other parameters, the outer coating is formulated so as to provide a greater degree of hardness for this coating than is available in the inner coating. Typically, the outer coating will have a Shore hardness of about 80, as compared to a Shore hardness of about 74 for the inner coating.

With attention now being directed to FIG. 3 of the drawings, a modified form of flyline is shown generally at 20, and which includes a hollow nylon braid core 21, which is covered by an inner or first coating 22 along with a second or outer coating 23. The composition employed for the individual coatings will, of course, be the same as that described hereinabove.

Preferably, the composite flyline structure will have a specific gravity which may range from between about 0.90 and up to about 0.96. The aspects of the present invention permit tailoring of the line to virtually any desired specific gravity. Also, as indicated, extremely lightweight lines may be fabricated having extremely durable skins or outer shells.

Under some fishing conditions, it is advantageous or preferable to have either substantial or discrete segments of these flylines having specific gravities greater than 1.0. In certain instances, therefore, it may be desirable to substitute high density spheres, such as solid glass spheres, or high density fillers in order to tailor the specific gravity of the line at various intervals therealong. Thus, controlled density of predetermined or pre-selected line segments may be obtained. For example, a certain line may desirably have a tip which has a specific gravity greater than 1 so as to achieve a sinking tip feature.

I claim:

1. A flyline for fishing and comprising a core with a plurality of coatings applied thereover, said line comprising:
   a. a continuous filament core extending axially along said line;
   b. a first coating arranged coaxially over said core and comprising a plastic matrix retaining a plurality of first microballoons distributed therethrough and with said microballoons having a diameter ranging from between about 10 microns and up to about 105 microns; and
   c. a second coating arranged coaxially over said first coating and comprising a plastic matrix retaining a plurality of second microballoons distributed therethrough and with said second microballoons having an average diameter substantially less than that average diameter of said first microballoons and ranging in diameter from between about 10 microns and up to about 75 microns.

2. The flyline for fishing as defined in claim 1 being particularly characterized in that the percentage of microballoons retained in said first coating is greater than that contained in said second coating.

3. The flyline for fishing as defined in claim 1 being particularly characterized in that said second coating has a hardness which exceeds that of said first coating.

4. The flyline for fishing as defined in claim 1 being particularly characterized in that said second coating is tapered in diameter along the length of said line.

5. The flyline for fishing as defined in claim 1 being particularly characterized in that said core is provided with a film of adhesive about the surface thereof, with said adhesive film being arranged between the outer surface of said core and the inner surface of said first coating.

6. The flyline for fishing as defined in claim 1 being particularly characterized in that said core is a braid of multifilament bundles.

7. The flyline for fishing as defined in claim 1 being particularly characterized in that said core is a hollow nylon braid of multifilament bundles.

8. The flyline for fishing as defined in claim 1 being particularly characterized in that said core is a monofilament consisting essentially of nylon.

9. The flyline for fishing as defined in claim 1 being particularly characterized in that said core is a monofilament having a sleeve of multifilament bundles arranged thereover.

10. The flyline for fishing as defined in claim 1 being particularly characterized in that the density of said first coating is less than that of said second coating.

11. The flyline for fishing as defined in claim 1 being particularly characterized in that said first coating has a wall thickness of between about 4 and 7 mils.

12. The flyline for fishing as defined in claim 1 being particularly characterized in that said first coating contains between about 10 and 11 percent by weight of microballoons, and said second coating contains between about 9 and 10 percent by weight of microballoons.

13. The flyline for fishing as defined in claim 1 being particularly characterized in that said core comprises a hollow nylon braid having a generally smooth outer surface.

14. The flyline for fishing as defined in claim 1 being particularly characterized in that one of said coatings includes a filler which consists of particulate particles having a density greater than 1.0, and wherein the composite flyline has a specific gravity greater than 1.0.

* * * * *